United States Patent
Frelechoux et al.

(10) Patent No.: US 6,944,674 B2
(45) Date of Patent: Sep. 13, 2005

(54) MANAGEMENT OF PROTOCOL INFORMATION IN PNNI HIERARCHICAL NETWORKS

(75) Inventors: Laurent Frelechoux, Thalwil (CH); Robert Haas, Adliswil (CH); Michael Osborne, Au (CH)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 09/877,483

(22) Filed: Jun. 8, 2001

(65) Prior Publication Data

US 2002/0023163 A1 Feb. 21, 2002

(30) Foreign Application Priority Data

Jun. 8, 2000  (EP) ............................................. 00112293

(51) Int. Cl.[7] ...................... G06F 15/173; H04L 12/26; H04L 12/28
(52) U.S. Cl. ........................ 709/238; 370/252; 370/256
(58) Field of Search ................................ 370/338, 256, 370/252, 352, 395.2, 254; 709/203, 238

(56) References Cited

U.S. PATENT DOCUMENTS 6,208,623 B1 * 3/2001 Rochberger et al. ........ 370/254
6,262,984 B1 * 7/2001 Rochberger .............. 370/395.2
6,600,724 B1 * 7/2003 Cheng ........................ 370/256
6,741,585 B1 * 5/2004 Munoz et al. .............. 370/352

* cited by examiner

Primary Examiner—Nabil El-Hady
Assistant Examiner—Philip Lee
(74) Attorney, Agent, or Firm—Douglas W. Cameron; Anne Vachon Dougherty (57) ABSTRACT

Methods and apparatus are provided for managing protocol information in a PNNI hierarchical network. In a PAR-enabled device (1) of the network PAR PTSEs received by the PAR-enabled device (1) from the network are checked to identify redundant protocol information encapsulated in the PAR PTSEs. Protocol information in received PAR PTSEs is then supplied to a protocol device associated with the PAR-enabled device (1). In some embodiments, protocol information identified as redundant is excluded from the protocol information supplied to the protocol device. In other embodiments, the protocol information supplied to the protocol device is tagged to distinguish redundant protocol information from non-redundant protocol information. This facilitates efficient configuration of the network topology for the protocol in question.

26 Claims, 5 Drawing Sheets

MANAGEMENT OF PROTOCOL INFORMATION IN PNNI HIERARCHICAL NETWORKS

FIELD OP THE INVENTION

This invention relates generally to management of protocol information in PNNI (Private Network-to-Network Interface) networks. Embodiments of the invention provide methods and apparatus for facilitating efficient configuration of higher layer topologies over the physical ATM (Asynchronous Transfer Mode) network topology.

BACKGROUND OF THE INVENTION

Before discussing the invention in more detail, it is useful to consider some background. PNNI is a hierarchical, dynamic link-state routing protocol defined by the ATM Forum for use in ATM networks. The PNNI protocol provides, inter alia, a system for creation and distribution of topology information which determines how individual network nodes "see" the network and thus how nodes communicate. A key feature of the protocol is the ability to cluster groups of switches into "peer groups". The details of each peer group are abstracted into a single logical node (a "logical group node" or LGN) which is all that can be seen outside of that peer group. One node in each peer group serves as the "peer group leader" and represents that peer group as the logical group node in the next level up of the hierarchy. This system is applied recursively so that PNNI can hierarchically aggregate network topology information. The PNNI topology information available to switches is such that each switch sees the details of its own peer group plus the details of any peer group that represents it at a higher level of the PNNI hierarchy. It is this hierarchical topology abstraction that reduces the resources required to support large-scale ATM networks.

The topology data communicated over PNNI networks is defined by PNNI Topology State Elements (PTSEs). PTSEs include data relating to nodes, links and addresses which can be accessed by network devices, and are created and distributed by nodes so that each node can maintain a topology database which defines its view of the network. PTSEs are flooded among nodes in a peer group so that each peer group node has the same topology database and thus the same view of the network. In the next level up of the hierarchy, however, the peer group topology is abstracted into a single logical node as described above. The logical group node generates PTSEs advertising addresses accessible within its child peer group and distributes these to its neighbors in the next level of the hierarchy, but the details of nodes and links within the peer group are lost. PTSEs generated by a logical group node in this way are also flooded back down the hierarchy, together with PTSEs received by the LGN from its neighbors, to enable the lower-level nodes to identify their "ancestors" (i.e. their representative nodes at higher levels of the PNNI hierarchy) and maintain their views of the PNNI topology.

In general, a PTSE which has been flooded through the network can only be modified by its originating node (i.e. the node which originated, or generated, that PTSE), though PNNI does define a "time-out" system for PTSEs whereby each PTSE is given a lifetime for which it is valid, normally one hour. A PTSE's originating node should "refresh" the PTSE periodically by redistributing the PTSE to its neighbors, so that the PTSE is again flooded through the network. However, if a PTSE's lifetime expires without the PTSE being refreshed, the PTSE is no longer considered valid topology information and is removed, or "flushed" from the network. So if a node becomes inaccessible due to a link failure for example, then PTSEs relating to that node will eventually be flushed from the network. In addition, our copending European Patent Application No. 99115580.5, filed 6 Aug. 1999, discloses mechanisms whereby a peer group leader can check the accessibility of addresses in its own peer group and notify neighboring nodes of changes in address accessibility within that peer group.

PNNI provides full support for mobility at the ATM layer ("PNNI Addendum for Mobility Extensions v1.0", ATM Forum af-ra-0123.000, April 1999). For example, the PNNI mobility extensions allow a logical group node abstracting a mobile ATM network to roam in the PNNI hierarchy of a terrestrial backbone network Routing information detailing the current location of the mobile network is advertised through regular PNNI, thus enabling the establishment of calls from a terrestrial end-system to an end-system of the mobile network, and vice versa. In addition, ATM networks can be used to carry higher layer protocol information such as IP (Internet Protocol) information. This can conveniently be done by employing an extension to the PNNI protocol known as PAR (PNNI Augmented Routing). PAR is described, for example in "PNNI Augmented Routing (PAR)", af-ra-0104.000, ATM Forum, January 1999. Briefly, PAR allows IP information, which is not related to operation of the ATM network in itself, to be distributed over the network. PAR makes use of the PTSEs discussed above to distribute IP-related information in addition to the ATM topology information. PAR-enabled devices in the network encapsulate UP information in PTSEs which are then distributed in the usual PNNI way. The IP information in these so-called "PAR PTSEs" is opaque to PNNI nodes that are not PAR-enabled, but other PAR-enabled nodes are aware of the format of the IP information in PAR PTSEs. Thus, a PAR-enabled device in the network can communicate IP information over the network by means of PAR PTSEs, and another PAR-enabled device can extract the IP information.

A further extension of the PNNI protocol known as "Proxy-PAR" allows higher layer protocol devices, in particular IP devices such as routers, to communicate IP information over the network without themselves participating in PNNI. Proxy-PAR is also described in "PNNI Augmented Routing (PAR)", af-ra-0104.000, ATM Forum, January 1999. Briefly, Proxy-PAR is a simple exchange protocol which allows the integration of IP devices into ATM networks without the need for the IP devices to run PNNI at all. An IP device can be connected to the network via a PAR-enabled device which is configured as a Proxy-PAR server The IP device itself is configured as a Proxy-PAR client. In accordance with Proxy-PAR, the Proxy-PAR client can register details of the IP services it supports with the Proxy-PAR server. This information is then encapsulated in PAR PTSEs as previously described and flooded in the network in the usual PNNI way. The Proxy-PAR client can also request the Proxy-PAR server for information on other IP devices connected in the network for which PAR PTSEs have been received by the PAR-enabled device as previously described. In this way, IP information is communicated between IP devices without the devices participating in PNNI.

Through use of PAR and Proxy-PAR as described above, protocol devices, in particular IP devices, can learn about each other via this communication of protocol information over the PNNI network, avoiding the need for manual input in each device of the protocol information needed for configuration of the higher layer protocol topology. For example, IP routers at the edge of an ATM cloud can learn about each other, and manual configuration of the IP adjacencies can be avoided. Further, our copending European Patent Application No. 99115544.1, filed 6 Aug. 1999, discloses mechanisms for dynamic configuration of OSPF (Open Shortest Path First) interfaces in IP routers. Routers in mobile networks, for example, can dynamically configure OSPF interfaces with the OSPF area of other (fixed or mobile) network routers as the mobile network roams and makes new connections Whether or not OSPF interfaces are configured dynamically, PAR and Proxy-PAR allow routers to register their protocol information (e.g. IP address, ATM address, OSPF area) with their serving ATM switches which then flood the data throughout the network. Other routers can retrieve this IP information by querying their serving ATM switches. Routers can then exchange routing information to form neighbor relationships, or "peer", in the usual way with other routers they learn about from the information received.

Thus, in general, when PAR is used for communication of protocol information between protocol devices over a PNNI network as described above, configuration of the higher layer protocol topology over the physical ATM network is based on the protocol information supplied by PAR-enabled switches to their client devices via Proxy-PAR. At present, a PAR-enabled switch responds to a Proxy-PAR request from its client device by supplying all protocol information of the type requested which has been received in PAR PTSEs from the network. The present invention is predicated on the realization that this is unnecessary and can compromise efficient configuration of the network topology for the protocol in question.

SUMMARY OF THE INVENTION

According to one aspect of the present invention there is provided a method for managing protocol information in a PAR-enabled device of a PNNI hierarchical network, the method comprising:

checking PAR PTSEs received by the PAR-enabled device from the network to identify redundant protocol information encapsulated in said PAR PTSEs; and supplying protocol information encapsulated in received PAR PTSEs to a protocol device associated with said PAR-enabled device, Wherein protocol information identified as redundant is excluded from the protocol information supplied to the protocol device.

According to a second aspect of the present invention there is provided a method for managing protocol information in a PAR-enabled device of a PNNI hierarchical network, the method comprising:

checking PAR PTSEs received by the PAR-enabled device from the network to identify redundant protocol information encapsulated in said PAR PTSEs; and supplying protocol information encapsulated in received PAR PTSEs to a protocol device associated with said PAR-enabled device;

wherein the method includes tagging the protocol information supplied to the protocol device to distinguish redundant protocol information from non-redundant protocol information.

Thus, in embodiments of the present invention, PAR PTSEs are checked by the PAR-enabled device to identify redundant protocol information. In some embodiments, protocol information supplied to the associated protocol device is tagged to distinguish redundant from non-redundant protocol information (e.g. by tagging one or both of redundant from non-redundant protocol information), so that an appropriately configured protocol device can distinguish the two and, for example, disregard the redundant information. In other, preferred, embodiments, protocol information identified as redundant is simply excluded from the protocol information supplied to the protocol device. Protocol information may be redundant because it is out-of-date, duplicated, unusable or otherwise superfluous, and by indicating this redundant information, or excluding it from the protocol information supplied to protocol device, simplifies processing of protocol information in the device and facilitates efficient configuration of the network topology for the protocol in question. The exclusion of redundant protocol information from the information supplied to the protocol device can be considered as a "filtering" operation, and can be applied to ensure that the protocol device only receives relevant protocol information.

In the preferred embodiments described in detail below, the protocol information comprises IP information, and the protocol device associated with the PAR-enabled device is an IP device, specifically a router. However, while IP is one particular protocol currently supported by PNNI, it will be apparent to those skilled in the art that PNNI could easily support other protocols. Thus, embodiments can be envisaged where the protocol information comprises IPX (Internetwork Packet Exchange), NtBIOS (Network Basic Input/Output System) or ARP (Address Resolution Protocol) information to name a few, non-exhaustive examples. Similarly, the protocol device associated with the PAR-enabled device could be any device which uses the protocol information extracted from PAR PTSEs in accordance with the protocol in question, such as a router, DNS (Domain Name System) server, ATM ARP server, directory server, or gateway for example.

Various checking processes can be performed by the PAR-enabled device to identify redundant information. For example, a received PAR PTSE may be checked to determine whether the network node which originated that PAR PTSE is present in the PNNI topology seen by the PAR-enabled device. If not, the protocol information encapsulated in that PAR PTSE can be considered redundant. This check can be conveniently performed by comparing the originating node id in the PAR PTSE with the id's of nodes in the PNNI topology seen by the PAR-enabled device (as defined by the usual PNNI topology data stored in the device). This check enables protocol information from a node which is no longer accessible (for example because a mobile network has moved and there is no longer connectivity between the originating node and the PAR-enabled device) to be identified as redundant.

Alternatively, and more preferably in addition, a PAR PTSE may be checked to determine whether a call path over the network to the ATM address of an IP service specified in the protocol information is available from the PAR-enabled device. If the usual path selection logic cannot accept a call to the ATM address (e.g. because the address is not reachable and a path cannot be computed, or insufficient resources are available), then a call path is not available and the protocol information is deemed redundant. This check can be of use, for example, when a network is partitioned and end-system addresses become unreachable. When applied in static ATM networks, this mechanism can prevent "ghost" PAR PTSEs where connectivity to a node that is being reset is removed before the node completes flushing of its PTSEs (e.g. the ATM switch resets).

As a further alternative (and more preferably in addition), a PAR PTSE may be checked to determine whether the originating node of the PAR PTSE is an ancestor of the PAR-enabled device in the PNNI hierarchy, i.e. a logical node which represents the device in a higher level of the PNNI topology. If so, then the protocol information contained in the PAR PTSE can be considered redundant. This check can be conveniently performed by comparing the originating node id in the PAR PTSE with the id's of ancestor nodes in the PNNI topology data stored in the PAR-enabled device. This check enables duplicates of protocol information, received in PTSEs generated by ancestor nodes, is identified as redundant.

In accordance with Proxy-PAR discussed above, the protocol device associated with the PAR-enabled device may be an independent device, configured as a Proxy-PAR client (i.e. including control logic for implementing the Proxy-PAR client operations defined by Proxy-PAR), the PAR-enabled device being configured as a Proxy-PAR server (i.e. including control logic for implementing the Proxy-PAR server functions defined by Proxy-PAR). In this case, the protocol information may be supplied by the PAR-enabled device in response to the usual periodic requests from the Proxy-PAR client device. However, other embodiments can be envisaged where the protocol device is integrated with the PAR-enabled device, e.g. as a combined device wherein ATM switch logic communicates with, for example, IP router logic via some internal communication protocol. Here, the router logic may periodically poll the PAR-enabled switch logic for IP information, whereupon the IP information may be supplied to the router logic in response to these requests similarly to Proxy-PAR. Alternatively, however, the switch logic could automatically supply the IP information to the router, e.g. at intervals or in response to an event such as a change in the PNNI topology or receipt of new PAR PTSEs from the network. In any case, the checking of PAR PTSEs (and/or the tagging of protocol information where provided) could be performed when the protocol information is to be supplied to the protocol device, e.g. when a request is received, or may be performed in advance in some cases, for example when PAR PTSEs are received, depending on the particular implementation.

It will be appreciated that embodiments of the invention can be applied to advantage in both fixed network and mobile network scenarios.

A third aspect of the present invention provides a PAR-enabled device for connection in a PNNI hierarchical network, the device comprising:

memory for storing PAR PTSEs received by the PAR-enabled device from the network; and control logic configured to check received PAR PTSEs to identify redundant protocol information encapsulated in said PAR PTSEs, and to supply protocol information encapsulated in received PAR PTSEs, excluding protocol information identified as redundant, to a protocol device associated with said PAR-enabled device.

A fourth aspect of the invention provides a PAR-enabled device for connection in a PNNI hierarchical network, the device comprising:

memory for storing PAR PTSEs received by the PAR-enabled device from the network; and control logic configured to check received PAR PTSEs to identify redundant protocol information encapsulated in said PAR PTSEs, and to supply protocol information encapsulated in received PAR PTSEs to a protocol device associated with said PAR-enabled device;

wherein the control logic is further configured to tag the protocol information supplied to the protocol device to distinguish redundant protocol information from non-redundant protocol information.

It is to be understood that, in general, where features are described herein with reference to a method embodying the invention, corresponding features may be provided in apparatus embodying the invention, and vice versa.

Another aspect of the invention provides a PNNI hierarchical network comprising a plurality of PAR-enabled devices and a plurality of protocol devices, each PAR-enabled device being associated with a respective protocol device for communication over the network of protocol information generated by that protocol device, wherein the PAR-enabled devices include at least one PAR-enabled device embodying the third or fourth aspect of the invention. Another aspect of the invention provides a computer program element comprising computer program code means which, when loaded in a processor of a PAR-enabled device for connection in a PNNI hierarchical network, configures the processor to perform a protocol information management method as described above.

BRIEF DESCRIPTION OF THE DRAWINGS

Preferred embodiments of the invention will now be described, by way of example, with reference to the accompanying drawings in which.

DETAILED DESCRIPTION OF THE INVENTION

A preferred embodiment of the invention will be described in the context of a mobile network system wherein IP information is communicated between IP routers via PAR and Proxy-PAR. Before describing operation of the embodiment, particular problems addressed by the embodiment will be explained with reference to FIGS. 1 and 2. Considering first FIG. 1, this illustrates one example of a mobile networking scenario in which mobile networks, provided for example on respective ships of a fleet, can form ad-hoc networks as they come into contact via line-of-sight links, and connectivity to a fixed network on the ground is provided via satellite connections to access points of the fixed network infrastructure. In the figure, switches S1 and S2 constitute access points of the fixed network, each supporting satellite links for connection of mobile networks to the fixed network. Access point switch S1 is connected to an IP router R1, and switch S2 is similarly connected to an IP router R2. Each access point switch S1, S2 forms a PNNI peer group (represented by the ellipses in the figure) with one or more other switches in the lowest level, level 88, of the PNNI hierarchy, two switches being shown in each peer group in this case. The peer soups are defined here such that there is only one fixed network router in each peer group In the next level, level 64 of the hierarchy, switch S1's level 88 peer group is represented by logical group node LGN1.0. Switch S2's peer group is represented by logical node LGN2.0 in level 64.

Figure 1:
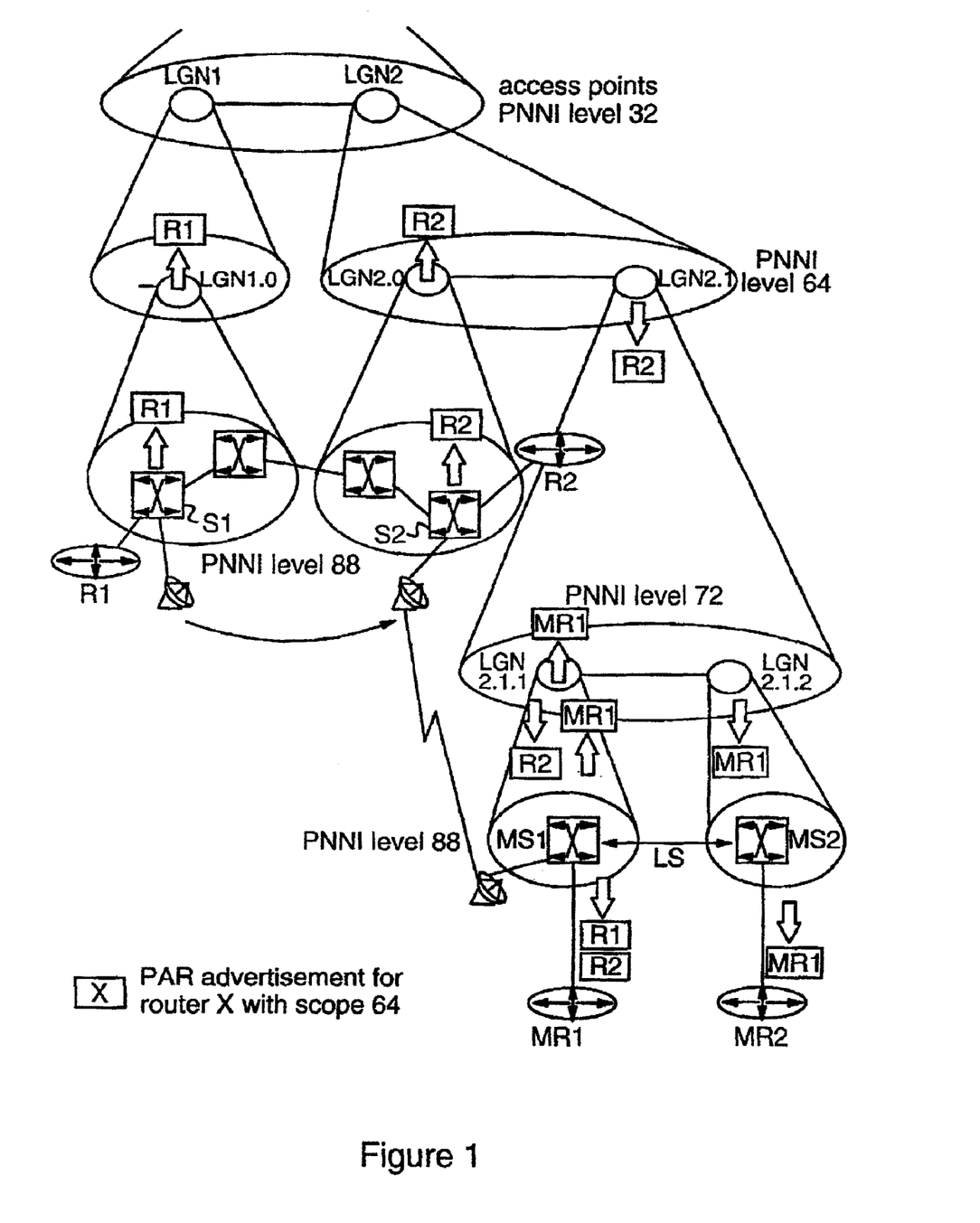
FIG. 1 is a schematic representation of a mobile network system illustrating a problem addressed by embodiments of the invention.

Two mobile networks are also shown in the figure, each represented for simplicity by a single switch, MS1 and MS2, connected to a mobile network router MR1 and MR2 respectively. The mobile network switches MS1 and MS2 are interconnected as illustrated via a laser line-of-sight link LS. MS1 is also connected to access point switch S2 of the fixed network via a satellite link as illustrated. Each switch MS1, MS2 forms a peer group in PNNI level 88. In the next level, level 72 of the PNNI hierarchy, the mobile network of MS1 is represented by logical group node LGN2.1.1. Similarly, the mobile network of MS2 is represented in level 72 by logical group node LGN2.1.2. Logical nodes LGN2.1.1 and LGN2.1.2 form a peer group in level 72, so at this level mobile network MS2 can integrate the hierarchy of mobile network MS1. Since mobile network MS1 is connected via satellite to access point node S2, the mobile networks' level 72 peer group is represented in level 64 of the hierarchy by logical node LGN2.1 which shares a peer group with LGN2.0 representing the access point node at this level. Level 64 is thus the level at which mobile networks can integrate the hierarchy of the access points network. There is no logical connection between LGN2.0 and LGN1.0 in level 64. The access points are logically connected at PNNI level 32, the "access points level", where logical group nodes LGN1 and LGN2 share a peer group as illustrated in the figure.

Each switch S1, S2, MS1 and MS2 is PAR-enabled and so can advertise IP information in the PNNI network by flooding PAR PTSEs, and can extract IP information from PAR PSTEs received from the network. Further, each switch is configured as a Proxy-PAR server for its connected router, each router being configured as a Proxy-PAR client. Thus, IP information is communicated between a router and its serving switch in accordance with Proxy-PAR as discussed above.

Proxy-PAR allows a router to indicate a scope when registering IP information with its serving switch, and the IP information encapsulated in PAR PTSEs by the switch is then advertised in the ATM network up to the PNNI level matching the specified scope. In the present example, the routers register their IP information with a scope equivalent to PNNI level 64. The resulting PAR advertisements have been simplified in the figure for clarity. In particular, the figure only illustrates the transmission of IP information registered by router R2 to router MR1, and the transmission of IP information registered by router MR1 to router MR2.

Considering first router R2, a PAR advertisement comprising IP information registered with switch S2 by router R2 is encapsulated in a PAR PTSE by S2 and flooded within the switch's level 88 peer group. This will be received by the peer group leader which represents the peer group as LGN2.0 in level 64. LGN2.0 thus generates a PAR PTSE for the IP information and floods this within its level 64 peer group where it is received by LGN2.1. This node floods the received PTSE down to its child peer groups, whereupon the IP information is eventually received by switch MS1 (and switch MS2). MS1 then forwards the IP information via Proxy-PAR to its client router MR1 as indicated. Also as shown, MS1 advertises the IP information registered by MR1 within its own peer group where it is received by the peer group leader serving as LGN2.1.1 in level 72. This node then generates a PAR PTSE advertising MR1 within its level 72 peer group where it is received by LGN2.1.2. LGN2.1.2 floods the PTSE to its child peer group in level 88, where MS2 then forwards the IP information via Proxy-PAR to its client router MR2.

Thus, when mobile network MS1 makes a satellite connection with access point S2, mobile router MR1 receives IP information (e.g. IP address, ATM address, OSPF area) from fixed network router R2. MR1 can then dynamically configure an OSPF interface with R2 as described in our copending European Patent Application No. 99115544.1 referenced above, the content of which is incorporated herein by reference. Thus, when a connection to the fixed network is established, MR1 can peer with the fixed network router, here R2, associated with the current access point. However, suppose that mobile network MS1 has just moved out of range of the satellite connection to access point S1, and the connection has been transferred to access point S2. In this case, mobile switch MS1 will still contain PAR PTSEs relating to fixed network router R1 in its memory from the previous satellite connection. As discussed earlier, PAR PTSEs can only be modified by the originating node (except in the case of "proxy flushing" which is not relevant here), so information from R1 will remain in memory in MS1 until the PTSE expires some 30 to 60 minutes later. During this period, MS1 will return IP information relating to both R1 and R2 to its client router MR1 in response to the periodic Proxy-PAR requests from MR1. MR1 cannot differentiate between information from the current access point and that from the old access point, and the default behaviour is thus to peer with both R1 and R2. Thus, as a mobile network roams and adapts into the fixed network via a series of access points, a history of PAR information can be accumulated in the serving switch, and the client router has no way to determine which PAR information relates to the current access point and which to old access points. Similarly, if mobile network MS2 in the figure moves out of range of MS1 and establishes a new line-of-sight link to another mobile network, MR2 will continue to receive information relating to MR1 from its serving switch until the associated PAR PTSEs expire. This problem is one of the problems addressed by the embodiment of the invention described below.

Figure 2:
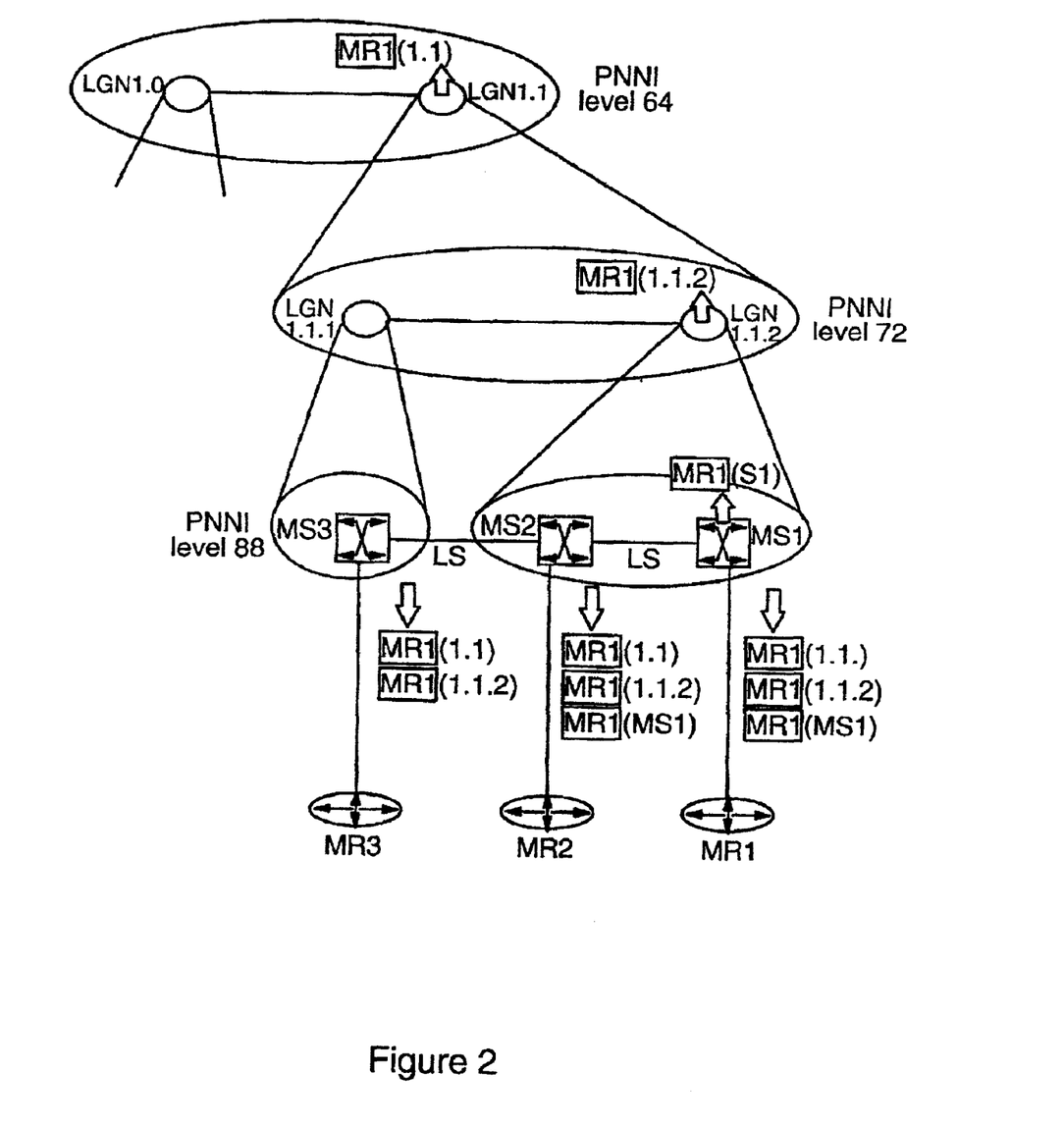
FIG. 2 is a schematic representation of another mobile network system illustrating a further problem addressed by embodiments of the invention.

FIG. 2 illustrates a second mobile networking scenario demonstrating a further problem addressed by the embodiment Here, three mobile networks are each represented for simplicity by a switch, MS1 to MS3, connected to a mobile network router, MR1 to MR3 respectively. The switches MS1 to MS3 are interconnected as illustrated via line-of-sight links LS between the mobile platforms. Switch MS3 represents a PNNI peer group in level 88 of the PNNI hierarchy, and switches MS1 and MS2 share another peer group in level 88. In the next level, level 72, switch MS3 is represented by logical group node LGN1.1.1, and MS2's level 88 peer group is represented by logical group node LGN1.1.2 These level 72 nodes share a peer group which is represented in turn by LGN1.1 in PNNI level 64. Assuming connectivity, for example, to a fixed network as in the scenario of FIG. 1, LGN1.1 shares a level 64 peer group with a logical node LGN1.0 representing the level 88 fixed network peer group.

The communication of IP information relating to mobile router MR1 in this system is illustrated by the PAR advertisements in the figure. A PAR PTSE encapsulating IP information registered by MR1 is generated by MS1 and flooded within MS1's level 88 peer group where it is received by switch MS2. LGN1.1.2 also abstracts this PTSE by generating a PAR PTSE at level 72 with the same IP information but with its own PNNI node id. LGN1.1.2 floods this PTSE within its level 72 peer group where it is received by LGN1.1.1, and LGN1.1.1 floods the received PTSE down to its own child peer groups, whereupon the PTSE is received by switch MS3. LGN1.1.2 also floods this PTSE back down to its own child peer groups where it is received by switches MS1 and MS2. Similarly, LGN1.1 abstracts the PAR PTSE generated by LGN1.1.2, generating a copy with its own node id, and floods this PTSE in its level 64 peer group and back down to its child peer groups. This PTSE is thus received by all three switches MS1, MS2, MS3.

Due to the regeneration of PAR PTSEs at every level of the PNNI hierarchy, switch MS3 receives two PAR PTSEs, both containing the same IP information relating to MR1, one originated by LGN1.1.2 and the other by LGN1.1. Thus, when MS3 receives a Proxy-PAR query from its client router MR3, MS3 will supply two copies of the IP information to the router as shown in the figure. (For ease of reference, the node id's of the originating nodes of the PAR PTSEs containing the PAR advertisements are indicated in the figure by the LGN numbers shown in brackets). Switch MS2, on the other hand, receives three PAR PTSEs for this IP information, so that three copies of the IP information will be sent by MS2 to its client router MR2 as indicated. Further, MS1 receives the two PAR PTSEs generated by LGN1.1.2 and LGN1.1, and also contains in its memory the PAR PTSE it generated itself for its own level 88 peer group. Thus, as indicated in the figure, MS1 here sends three copies of the IP information back to MR1, two received from its ancestor nodes and one from its own self-generated PTSE in this example. It will be seen from this example that the regeneration of PAR PTSEs in different levels of the hierarchy results in each router receiving duplicates of the same IP information, and the problem is clearly exacerbated when the PAR advertisements from all routers are considered. This problem is also addressed by the embodiment of the invention described below.

Figure 3:
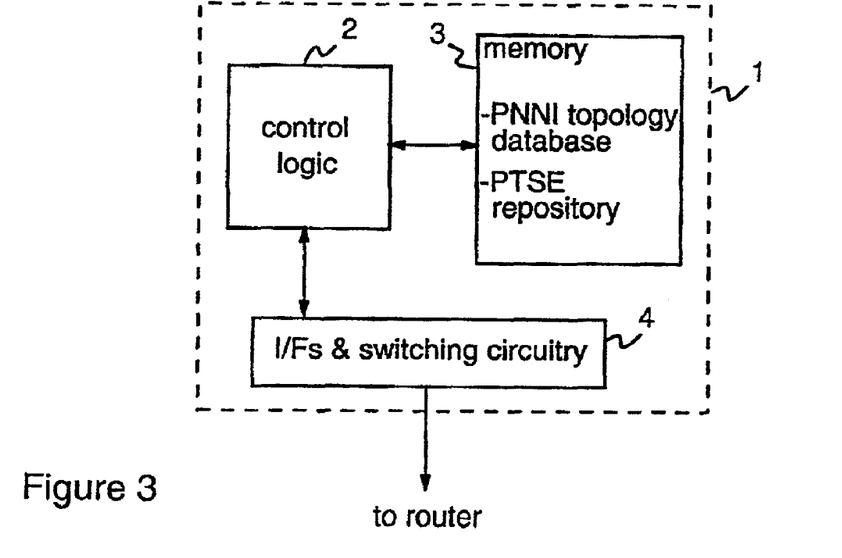
FIG. 3 is a schematic block diagram of a switch embodying the invention.

FIG. 3 is a simplified schematic illustrating the main elements of a switch involved in operation of this embodiment. The switch 1 comprises control logic 2, memory 3 and circuitry 4 comprising the interfaces and switching circuitry via which the device communicates with the rest of the network and with its associated router. The switch 1 in this embodiment is a PAR-enabled device serving as a Proxy-PAR server for the associated router. The control logic 2 controls operation of the switch generally, and thus implements the usual PAR and Proxy-PAR functions, as well as the usual PNNI functions such as PTSE generation and processing, call path selection, etc. In addition, the control logic 2 performs the IP information management functions described in detail below. In accordance with PNNI, control logic 2 maintains a topology database in memory 3. The topology database contains topology data which defines the switch's view of the network topology, and identifies ancestors of the switch in the PNNI hierarchy, as described further below. Memory 3 also contains a PTSE repository in which PTSEs received from the network are stored by control logic 2 until the PTSEs expire or are flushed by the usual PNNI processes. In general, the control logic 2 may be implemented in hardware or software, or a combination thereof, but will typically be implemented by a processor running software which configures the processor to perform the functions described, and suitable software will be apparent to those skilled in the art from the description herein. (Of course, while the switch processor may be preconfigured with appropriate software, the program code constituting such software could be supplied separately for loading in the device to configure the processor to operate as described. Such program code could be supplied as an independent element or as an element of the program code for a number of control functions, and may be supplied embodied in a computer-readable medium, such as a diskette or an electronic transmission sent to a network operator, for loading in the switch).

The IP information management process implemented by control logic 2 includes three filtering mechanisms in this embodiment. Each filter involves checking PAR PTSEs stored in memory 3 to identify redundant IP information which is then excluded from the IP information supplied to the client router in response to a Proxy-PAR request. The first filter checks whether the originating node for a PAR PTSE is present in the PNNI topology seen by the switch. The second filter checks whether a call path is available over the network to the ATM address of the IP service to which a PAR PTSE relates. The third filter checks whether the originating node for a PAR PTSE is an ancestor of the switch in the PNNI hierarchy. Each filter thus makes use of the topology data stored in memory 3. A simplified example of the network topology defined by the topology data will be described with reference to FIG. 4.

Figure 4:
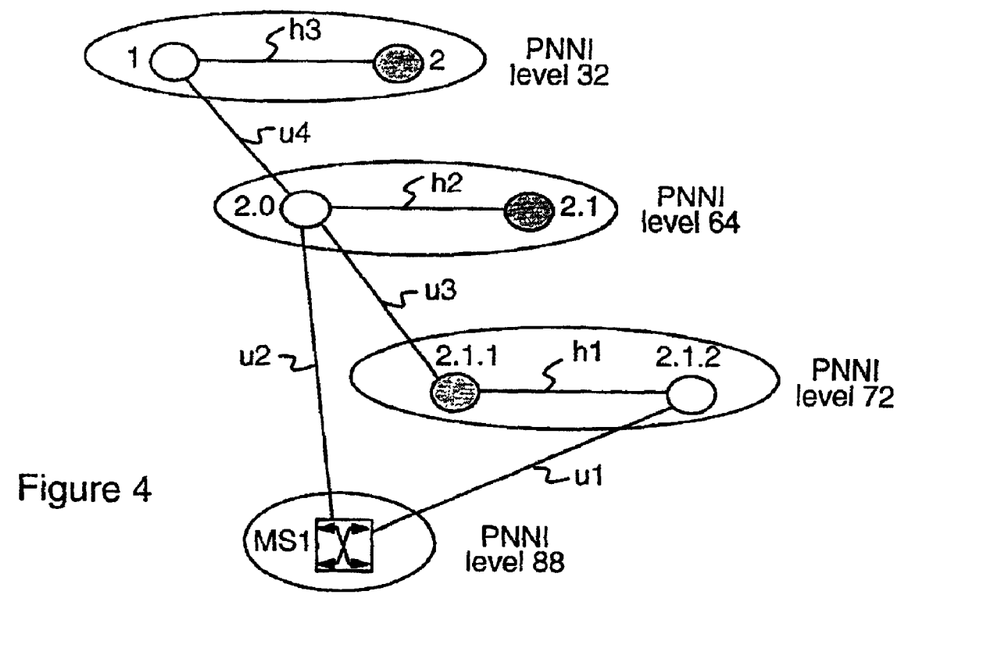
FIG. 4 illustrates the PNNI topology seen by one switch in the system of FIG. 1.

As previously described, the communication of PNNI topology data in an ATM network is such that each switch sees the details of its own peer group plus the details of any peer group that represents it at a higher level of the PNNI hierarchy. The schematic of FIG. 4 illustrates the PNNI topology seen by switch MS1 in the system of FIG. 1 after handover of the satellite connection from switch S1 to switch S2. In this view of the topology, MS1 is connected to level 72 LGN2.1.2 via uplink u1. Due to the satellite connection between MS1 and S2, MS1 is also connected to level 64 LGN2.0 via uplink u2. LGN2.1.2 is connected to LGN2.1.1 in level 72 via horizontal link h1. LGN2.1.1 is connected to level 64 LGN2.0 via uplink u3, and LGN2.0 is connected to LGN2.1 in level 64 via horizontal link h2. Similarly, LGN2.0 is connected to level 32 LGN1 via uplink u4, and LGN1 is connected to LGN2 in level 32 via horizontal link h3. The ancestors of MS1 in the PNNI hierarchy (i.e. the logical nodes which represent MS1 in upper layers of the hierarchy) are shown shaded in the figure. The topology database of MS1 in this case contains data defining links, node ids and device addresses for the illustrated topology, together with a nodal hierarchy list which indicates the node id's (and ATM addresses) of ancestor nodes in the hierarchy.

Figure 5:
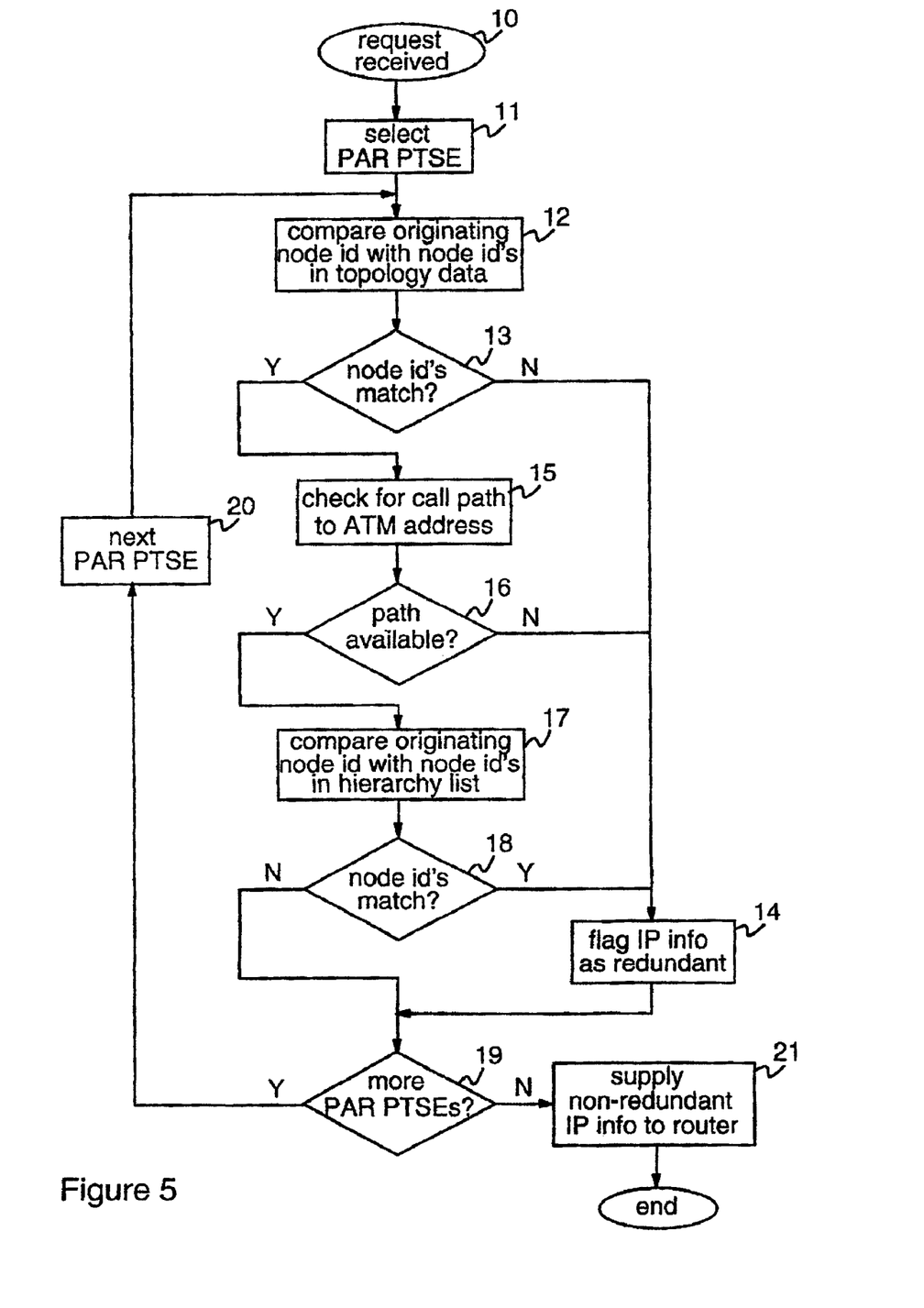
FIG. 5 is a flow chart illustrating the IP information management method implemented by the switch of FIG. 3.

In operation of the switch 1 in a network system, the switch 1 receives PAR PTSEs from the network and these are stored by control logic 2 in the PTSE repository of memory 3. In response to the periodic Proxy-PAR requests issued by the client router, the control logic 2 extracts IP information from PAR PTSEs stored in memory 3 and supplies this IP information to the router in the usual PAR service description packets. FIG. 5 illustrates in more detail the operations performed by the switch control logic 2 as part of this IP information communication process. On receipt of a Proxy-PAR request from the router as indicated at step 10 of FIG. 5, the control logic 2 accesses the PTSE repository in memory 3 and, at step 11, selects a first PAR PTSE according to the request issued by the router. In step 12, the control logic then compares the originating node id in the PAR PTSE with the node id's in the topology data defining the switch's view of the network as described above. (Note that, in alternative embodiments, the control logic could compare the ATM address of the originating node as specified in the PAR PTSE with the ATM addresses of nodes stored in the topology database here). If a match is not found, as indicated by a "No" at step 13, then the originating node is no longer accessible by the switch in the current topology. This may occur, for example, where a mobile network moves and no longer has connectivity to the originating node in the new topology. In this case, operation proceeds to step 14 where a flag is set in memory 3 to mark the IP information encapsulated in the PAR PTSE as redundant. Steps 12, 13 and 14 thus constitute the first filter discussed above. From step 14, operation proceeds to step 19 where the control logic checks whether there are further PAR PTSEs in memory 3 to be checked. Assuming so, the next PTSE is selected in step 20 and operation reverts to step 12 for this PTSE.

Assuming a match is found at step 13, operation proceeds to step 15 where the control logic checks whether a call path is available to the ATM address of the IP service identified by the IP information in the PTSE. Thus, if the path selection logic cannot compute a path to the ATM address (for example because the IP service is not reachable due to an end-system malfunction), or sufficient network resources (bandwidth, delay, etc.) are not available to set up a call to the address, then it will be determined at step 16 that a path is not available. In this case, operation reverts to step 14, where the IP information is flagged as redundant, and then proceeds to step 19 as before. Steps 15, 16 and 14 thus constitute the second filter discussed above.

Assuming that a call path is available at step 16, then, in step 17, the control logic compares the originating node id in the PAR PTSE with the node id's in the nodal hierarchy list in memory 3 as described above. In this embodiment, it is assumed that the nodal hierarchy list includes the node id of the switch itself as well as the id's of ancestors at higher levels. If a match is found as indicated by a "Yes" at step 18, then the PAR PTSE was generated by the switch itself or an ancestor in an upper level of the hierarchy. In this case, operation reverts to step 14, where the IP information is flagged as redundant, and then continues as before. Steps 17, 18 and 14 thus constitute the third filter discussed above. (Note that, since the nodal hierarchy list contains the ATM address of the relevant nodes as well as the node id's in this example, this filter could equally be implemented by comparing the ATM addresses of nodes in the hierarchy list with the ATM address of the originating node as specified in the PAR PTSE).

If a match is not found at step 18, then the IP information in the current PTSE is not considered redundant, and operation proceeds to step 19 and continues to step 20 where the next PAR PTSE is selected as before. Once all relevant PTSEs have been checked, as indicated by a "No" at step 19, the control logic proceeds to step 21. Here, all non-redundant IP information corresponding to the Proxy-PAR request is retrieved from memory and supplied to the client router. The process is then complete.

Figure 6:
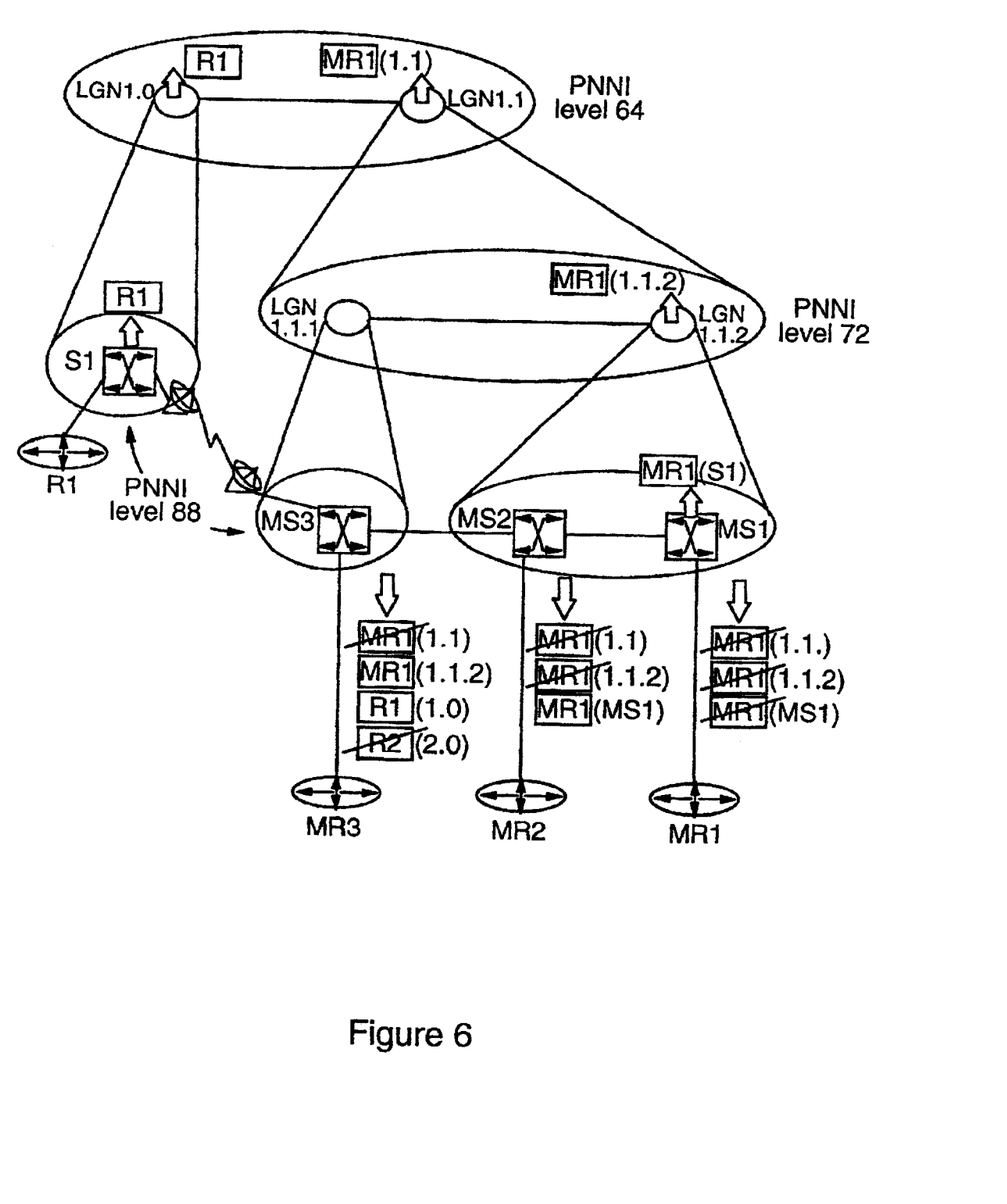
FIG. 6 is a schematic representation of a mobile network system illustrating operation of the embodiment.

FIG. 6 illustrates a mobile network system similar to FIG. 2 in which each switch MS1, MS2 and MS3 is a switch 1 according to the embodiment described above. In this a scenario, it is assumed that switch MS3 has a satellite connection to an access point switch S1 (with associated router R1) of a fixed network, following handover of the satellite connection from an access point switch S2, with associated router R2, (not shown) as in the FIG. 1 scenario. The PAR advertisements here have been simplified in the figure for clarity. In particular, the figure only shows the communication of PAR advertisements to MR3 from fixed network, together with the communication of PAR advertisements from mobile router MR1 in the mobile networks. The PAR advertisements identified as redundant by the switches MS1 to MS3, and thus excluded from the IP information sent to the mobile routers, are indicated by the strike-through lines in the figure. It will be seen that switch MS3 sends its client router MR3 only the PAR advertisement for fixed network router R1 and the PAR advertisement for MR1 received from LGN1.1.2. The LGN representing access point switch S2 (LGN2.0 in FIG. 1) is no longer visible in the PNNI topology seen by switch MS3, and so the "old" PAR advertisement for router R2 is excluded from the IP information sent to MR3 through operation of the first filter described above. The duplicate PAR advertisement for MR1 originating from MS3's ancestor node LGN1.1 is eliminated by the third filter described above. Further, if a call path to R1 were found to be unavailable by MS3, due to malfunction of R1 for example, then the PAR advertisement for R1 would be identified as redundant by the second filter discussed above, and would not be supplied by MS3 to MR3.

In MS2, only the PAR advertisement for MR1 received from switch MS1 is supplied to client router MR2, the duplicate PAR advertisements received from MS2's ancestors LGN1.1 and LGN1.1.2 being excluded by the third filtering mechanism. In MS1, all PAR advertisements for MR1 are excluded by this third filter, including the PAR advertisement in the PTSE generated by MS1 itself since, as described above, the nodal hierarchy list includes MS1's own node id in this embodiment.

The substantial simplification of the IP information received by routers in this embodiment is clearly apparent from FIG. 6. However, it will be understood that the benefit is increased dramatically when all PAR advertisements are considered, rather than merely the selected PAR advertisements illustrated in FIG. 6. It will therefore be apparent that, by eliminating redundant information, the PAR-enabled devices greatly simplify the IP information supplied to the associated routers, simplifying data processing in the routers and facilitating optimum configuration of the IP topology.

While a particularly preferred embodiment of the invention has been described in detail above, it will be appreciated that many changes and modifications can be made to the embodiment described without departing from the scope of the invention. For example, while three filtering mechanisms are employed in the above embodiment, one or any combination of these filtering mechanisms may be employed in other embodiments as desired. Further, while the filtering is performed in response to a Proxy-PAR request in the above embodiment, one or more of the filtering mechanisms could be applied in advance in some embodiments, e.g. on receipt of PAR PTSEs from the network. In addition, while the switch and router in the above embodiment are separate devices communicating via Proxy-PAR, embodiments can be envisaged where the router is integrated with the PAR-enabled device. In this case, the router logic may communicate with the PAR logic via some other, internal, communications protocol.

In alternative embodiments, rather than excluding redundant IP information, the IP information could be tagged by the switch as discussed above to enable the associated router to distinguish redundant and non-redundant information. In addition, it will be appreciated that, though an example of the invention has been described in the context of mobile networking scenarios, embodiments of the invention can also be applied to advantage in fixed network systems, facilitating auto-configuration of the IP topology. Moreover, as discussed earlier, embodiments of the invention may be applied with protocols other than IP, and with protocol devices other than IP routers.

We claim:

1. A method for managing protocol information in a Private Network-to-Network Interface Augmented Routing-enabled (PAR-enabled) device of a Private Network-to-Network Interface PNNI) hierarchical network, the method comprising:

checking PAR PNNI Topology State Elements (PTSEs) received by the PAR-enabled device from the network to identify redundant protocol information encapsulated in said PAR PTSEs; and supplying protocol information encapsulated in received PAR PTSEs to a protocol device associated with said PAR-enabled device, wherein protocol information identified as redundant is excluded from the protocol information supplied to the protocol device.

2. The method according to claim 1 wherein the checking of a received PAR PTSE comprises determining whether the network node which originated that PAR PTSE is present in the PNNI topology seen by the PAR-enabled device, wherein the protocol information encapsulated in the PAR PTSE is identified as redundant if said network node is not present in said topology.

3. The method according to claim 2 including determining whether said network node which originated the PAR PTSE is present in said topology by comparing a node id identifying said network node in the PAR PTSE with node ids, identifying network nodes in said topology, of topology data stored in the PAR-enabled device.

4. The method according to claim 1 wherein the checking of a received PAR PTSE comprises determining whether a call path over the network to an Asynchronous Transfer Mode (ATM) address in the protocol information encapsulated in the PAR PTSE is available from the PAR-enabled device, wherein the protocol information is identified as redundant if the call path is not available.

5. The method according to claim 1 wherein the checking of a received PAR PTSE comprises determining whether the network node which originated that PAR PTSE is an ancestor of the PAR-enabled device in the PNNI hierarchy, wherein protocol information encapsulated in the PAR PTSE is identified as redundant if said network node is an ancestor of the PAR-enabled device.

6. The method according to claim 5 including determining whether said network node which originated the PAR PTSE is an ancestor of the PAR-enabled device by comparing a node id identifying said network node in the PAR PTSE with node ids, identifying ancestors of the PAR-enabled device in the PNNI hierarchy, of topology data stored in the PAR-enabled device.

7. The method according to claim 1 including supplying the protocol information to the protocol device in response to a request from the protocol device.

8. The method according to claim 1 including performing said checking, and supplying the protocol information to the protocol device, in response to a request from the protocol device.

9. The method according to claim 1 wherein the PAR-enabled device is configured as a Proxy-PAR server, and the protocol device is configured as a Proxy-PAR client.

10. The method according to claim 1 wherein the protocol information comprises IP information.

11. The method according to claim 1 wherein the protocol device comprises a router.

12. A method for managing protocol information in a Private Network-to-Network Interface Augmented Routing-enabled (PAR-enabled) device of a Private Network-to-Network Interface (PNNI) hierarchical network, the method comprising:

checking PAR PNNI Topology State Elements (PTSEs) received by the PAR-enabled device from the network to identify redundant protocol information encapsulated in said PAR PTSEs; and supplying protocol information encapsulated in received PAR PTSEs to a protocol device associated with said PAR-enabled device;

wherein the method includes tagging the protocol information supplied to the protocol device to distinguish redundant protocol information from non-redundant protocol information.

13. A Private Network-to-Network Interface Augmented Routing-enabled (PAR-enabled) device for connection in a Private Network-to-Network Interface (PNNI) hierarchical network, the device comprising:

memory for storing PAR PNNI Topology State Elements (PTSEs) received by the PAR-enabled device from the network; and control logic configured to check received PAR PTSEs to identify redundant protocol information encapsulated in said PAR PTSEs, and to supply protocol information encapsulated in received PAR PTSEs, excluding protocol information identified as redundant, to a protocol device associated with said PAR-enabled device.

14. The PAR-enabled device according to claim 13 wherein the control logic is configured to maintain topology data, comprising data defining the PNNI topology seen by the PAR-enabled device, in said memory, and to check a received PAR PTSE by determining whether the network node which originated that PAR PTSE is present in said topology, wherein the control logic identifies protocol information encapsulated in the PAR PTSE as redundant if said network node is not present in said topology.

15. The PAR-enabled device according to claim 14 wherein the control logic is configured to determine whether said network node which originated the PAR PTSE is present in said topology by comparing a node id identifying said network node in the PAR PTSE with node ids, identifying network nodes in said topology, of said topology data.

16. The PAR-enabled device according to claim 13 wherein the control logic is configured to check a received PAR PTSE by determining whether a call path over the network to an Asynchronous Transfer Mode (ATM) address in the protocol information encapsulated in the PAR PTSE is available from the PAR-enabled device, wherein the control logic identifies the protocol information as redundant if the call path is not available.

17. The PAR-enabled device according to claim 13 wherein the control logic is configured to maintain topology data, comprising data identifying ancestors of the PAR-enabled device in the PNNI hierarchy, in said memory, and to check a received PAR PTSE by determining whether the network node which originated that PAR PTSE is an ancestor of the PAR-enabled device in said hierarchy, wherein the control logic identifies the protocol information encapsulated in the PAR PTSE as redundant if said network node is an ancestor of the PAR-enabled device.

18. The PAR-enabled device according to claim 17 wherein the control logic is configured to determine whether said network node which originated the PAR PTSE is an ancestor of the PAR-enabled device by comparing a node id identifying said network node in the PAR PTSE with node ids, identifying ancestors of the PAR-enabled device, of said topology data.

19. The PAR-enabled device according to claim 13 wherein the control logic is configured to supply the protocol information to the protocol device in response to a request from the protocol device.

20. The PAR-enabled device according to claim 13 wherein the control logic is configured to check the PAR PTSEs, and supply the protocol information to the protocol device, in response to a request from the protocol device.

21. The PAR-enabled device according to claim 19 wherein the control logic includes Proxy-PAR server logic for supplying the protocol information to the protocol device in response to a Proxy-PAR request from the protocol device.

22. A Private Network-to-Network Interface Augmented Routing-enabled (PAR-enabled) device for connection in a Private Network-to-Network Interface (PNNI) hierarchical network, the device comprising:
    memory for storing PAR PNNI Topology State Elements (PTSEs) received by the PAR-enabled device from the network; and
    control logic configured to check received PAR PTSEs to identify redundant protocol information encapsulated in said PAR PTSEs, and to supply protocol information encapsulated in received PAR PTSEs to a protocol device associated with said PAR-enabled device;
    wherein the control logic is further configured to tag the protocol information supplied to the protocol device to distinguish redundant protocol information from non-redundant protocol information.

23. A Private Network-to-Network Interface (PNNI) hierarchical network comprising a plurality of PNNI Augmented Routing-enabled (PAR-enabled) devices and a plurality of protocol devices, each PAR-enabled device being associated with a protocol device for communication over the network of protocol information generated by that protocol device, wherein said PAR-enabled devices include at least one PAR-enabled device according to claim 13.

24. A Private Network-to-Network Interface (PNNI) hierarchical network comprising a plurality of PNNI Augmented Routing-enabled (PAR-enabled) devices and a plurality of protocol devices, each PAR-enabled device being associated with a protocol device for communication over the network of protocol information generated by that protocol device, wherein said PAR-enabled devices include at least one PAR-enabled device according to claim 22.

25. A computer program product comprising a computer usable medium having embodied therein computer readable program code means for causing a processor of a Private Network-to-Network Interface Augmented Routing-enabled (PAR-enabled) device of a Private Network-to-Network Interface (PNNI) hierarchical network to perform a protocol information management method comprising the steps of:
    checking PAR PNNI Topology State Elements (PTSEs) received by the PAR-enabled device from the network to identify redundant protocol information encapsulated in said PAR PTSEs; and
    supplying protocol information encapsulated in received PAR PTSEs to a protocol device associated with said PAR-enabled device, wherein protocol information identified as redundant is excluded from the protocol information supplied to the protocol device.

26. A computer program product comprising a computer usable medium having embodied therein computer readable program code means for causing a processor of a Private Network-to-Network Interface Augmented Routing-enabled (PAR-enabled) device of a Private Network-to-Network Interface (PNNI) hierarchical network to perform a protocol information management method comprising the steps of:
    checking PAR PNNI Topology State Elements (PTSEs) received by the PAR-enabled device from the network to identify redundant protocol information encapsulated in said PAR PTSEs; and
    supplying protocol information encapsulated in received PAR PTSEs to a protocol device associated with said PAR-enabled device;
    said method including the step of tagging the protocol information supplied to the protocol device to distinguish redundant protocol information from non-redundant protocol information.

* * * * *